United States Patent
Rhodes et al.

(10) Patent No.: US 7,163,038 B2
(45) Date of Patent: Jan. 16, 2007

(54) SYSTEMS AND METHODS FOR END SQUARING AND DIVIDING ELONGATED MATERIALS

(75) Inventors: Robert T. Rhodes, Graham, WA (US);
Thomas M. Scott, Olympia, WA (US);
Clifford P. Isaman, Kent, WA (US);
Otto M. Allison, Tacoma, WA (US);
Calvin D. Bamford, Jr., Tacoma, WA (US)

(73) Assignee: Globe Machine Manufacturing Company, Tacoma, WA (US)

( * ) Notice: Subject to any disclaimer, the term of this patent is extended or adjusted under 35 U.S.C. 154(b) by 448 days.

(21) Appl. No.: 10/835,282

(22) Filed: Apr. 30, 2004

(65) Prior Publication Data

US 2005/0189040 A1   Sep. 1, 2005

Related U.S. Application Data

(60) Provisional application No. 60/548,178, filed on Mar. 1, 2004.

(51) Int. Cl.
  *B27B 31/00*    (2006.01)
  *B27C 1/12*     (2006.01)
  *B27C 5/02*     (2006.01)
(52) U.S. Cl. ............... 144/245.2; 144/3.1; 144/357; 144/242.1; 144/245.1; 83/435.2; 198/468.9
(58) Field of Classification Search ........ 144/356, 144/357, 363, 371, 376, 394, 425, 242.1, 144/250.17, 245.2, 3.1, 245.4, 2.1, 245.6, 144/245.1; 83/422, 426, 435.2, 437.2, 404.1, 83/432, 433; 198/468.9, 468.7, 468.11, 626.3

See application file for complete search history.

(56) References Cited

U.S. PATENT DOCUMENTS

| | | | |
|---|---|---|---|
| 2,729,248 A * | 1/1956 | King | 83/89 |
| 2,931,401 A * | 4/1960 | Lambert | 144/250.23 |
| 3,229,732 A * | 1/1966 | Mayo | 83/404.1 |
| 4,164,248 A | 8/1979 | Rysti | |
| 4,173,238 A * | 11/1979 | Pryor et al. | 144/356 |
| 4,231,460 A | 11/1980 | Heikinheimo | |
| 4,462,443 A * | 7/1984 | Allen | 144/245.1 |
| 4,489,635 A | 12/1984 | Cooper | |
| 4,945,797 A | 8/1990 | Hahn | |
| 5,251,141 A | 10/1993 | Payr | |
| 5,368,080 A * | 11/1994 | Hamel | 144/357 |
| 5,381,712 A * | 1/1995 | Head et al. | 83/418 |
| 5,785,102 A * | 7/1998 | Hamel | 144/387 |
| 5,865,080 A | 2/1999 | Jackson | |
| 5,943,239 A * | 8/1999 | Shamblin et al. | 700/160 |
| 6,173,829 B1 | 1/2001 | Jackson et al. | |
| 6,240,821 B1 | 6/2001 | Landers et al. | |
| 6,311,828 B1 | 11/2001 | Newnes et al. | |
| 6,382,067 B1 * | 5/2002 | Gagnon | 83/732 |
| 6,520,228 B1 | 2/2003 | Kennedy et al. | |
| 6,543,498 B1 | 4/2003 | Woodham | |

(Continued)

*Primary Examiner*—Bena Miller
(74) *Attorney, Agent, or Firm*—Lowe Hauptman & Berner, LLP

(57) ABSTRACT

The present invention provides systems and methods for end squaring and/or dividing elongated materials by determining an actual orientation of the elongated material, or an actual position of an associated pair of positioning mechanisms that are contactable with the elongated material, and changing the actual orientation to correspond with a desired orientation through independent movement of the positioning mechanisms prior to or during the end squaring and/or dividing operation.

21 Claims, 6 Drawing Sheets

U.S. PATENT DOCUMENTS

2003/0015256 A1 1/2003 Quenneville
2003/0145906 A1 8/2003 Tekulve
2003/0209116 A1 11/2003 Culpepper

* cited by examiner

SYSTEMS AND METHODS FOR END SQUARING AND DIVIDING ELONGATED MATERIALS

CROSS REFERENCE TO RELATED APPLICATIONS

The present application claims priority to U.S. Patent Application Ser. No. 60/548,178 filed Mar. 1, 2004, hereby incorporated by reference.

BACKGROUND

The present invention relates to systems and methods for processing elongated materials, and in particular, to systems and methods for end squaring and/or dividing elongated materials.

In processing a rigid elongated material, such as a wood board or panel, a manufacturer generally must adhere to a given set of cut, quality and dimensional standards. In the past, various machines have been utilized to hold, square and divide the elongated material. For example, a typical sawing machine may include a number of stationary, rotating saw blades that divide a large wood panel into a number of smaller panels. The large wood panel is typically held and fed into the saws by a conveyor system, such as by a chain-driven system of lugs or holding blocks. In order to move the entire large panel through the saws at the same time, the chain-driven system may include a number of endless chains spaced apart along the length of the large panel. The endless chains are interconnected by a head shaft that is connected to a single motor such that each chain, and hence each corresponding lug, moves the panel through the saws at the same speed.

Such a typical sawing machine cannot consistently produce panels within the given set of cut, quality and dimensional standards, however, as the lug position on each endless chain can change as the endless chain continually wears or stretches over time, or moves upon the occasional crash of the machine. As a result, typical sawing machines require a tremendous amount of maintenance to insure the lugs are consistently in the proper relative positions. Further, there is a limit as to how much a lug position can be adjusted before a new chain must be installed. For instance, because the endless chains are driven off of the same motor by the head shaft, when one chain becomes stretched the position of its lug(s) will always be moving relative to a non-stretched chain. When the amount of chain stretch produces lug movement that results in "out of spec" sawn product, such as a panel that does not fall within a squareness specification, then the stretched chain must be replaced. Installation of a new chain is even more costly than routine maintenance, as the sawing machine must be shut down and thus loses valuable production time, and as the chain itself is extremely expensive.

Thus, there is a need for a system and method of insuring that an end squaring and dividing machine produces elongated materials that fall within defined cut, quality and dimensional specifications while reducing maintenance costs and machine down time.

BRIEF DESCRIPTION

The present invention provides systems and methods for end squaring and/or dividing elongated materials by determining an actual orientation of the elongated material, or an actual position of an associated pair of positioning mechanisms that are contactable with the elongated material, and changing the actual orientation to correspond with a desired orientation through independent movement of the positioning mechanisms prior to or during the end squaring and/or dividing operation.

In one embodiment, for example, a system for end squaring and/or dividing an elongated material comprises at least one dividing mechanism having a first dividing plane and first and second transport mechanisms for positioning and moving the elongated material relative to the first dividing plane. The first transport mechanism is movable in response to a first control signal in a substantially parallel direction relative to the first dividing plane. A first engagement element is connectable with the first transport mechanism and has a first contact surface for engaging the elongated material. The second transport mechanism is spaced apart from the first transport mechanism and is movable independently from the first transport mechanism in response to a second control signal in a substantially parallel direction relative to the first dividing plane. A second engagement element is connectable with the second transport mechanism and has a second contact surface for engaging the elongated material. The system further includes a detector system that has a first detected output and a second detected output representing an actual position associated with the first contact surface and an actual position associated with the second contact surface, respectively, relative to the at least one dividing mechanism. Also included in the system is a correction module that has a correction program that generates at least one correction factor based on the first detected output and the second detected output, wherein the correction factor represents a corrected position of at least one of the first contact surface and the second contact surface such that a line between the first contact surface and the second contact surface is substantially perpendicular to the first dividing plane. And the system includes a controller system that is operable to generate the first control signal and the second control signal representing a desired movement of the first transport mechanism and the second transport mechanism, respectively, relative to the at least one dividing mechanism. Further, at least one of the first control signal and the second control signal comprises the at least one correction factor.

In another embodiment, a system for positioning a substantially rigid sheet of material comprises first and second positioning mechanisms, a detector system and a controller system. The first positioning mechanism has a first engagement surface movable in a first direction, where the first engagement surface includes a first linear portion perpendicular to the first direction. The first positioning mechanism also has a first drive connectable with the first engagement surface and operable to move the first engagement surface in the first direction according to a first predetermined control signal. The second positioning mechanism has a second engagement surface movable along a substantially parallel path relative to first engagement surface, where the second engagement surface includes a second linear portion perpendicular to the first direction. The second positioning mechanism also has a second drive connectable with the second engagement surface and operable to move the second engagement surface in the first direction according to a second predetermined control signal, where the second drive is independently movable relative to the first drive. The detector system is operable to generate at least one position signal corresponding to an actual position of the first engagement surface relative to the second engagement surface. The controller system is operable to generate the first predetermined control signal, the second predetermined control signal and at least one correction signal. The correction signal is based upon the at least one position signal and comprises a difference between the actual position of the first engagement surface relative to the second engagement surface and a predetermined position. The predetermined position comprises a position wherein a first plane through a first predetermined portion of the first positioning mechanism and a second predetermined portion of the second positioning mechanism is substantially perpendicular to the first direction. In this embodiment, at least one of the first predetermined control signal and the second predetermined control signal includes the at least one correction signal.

In yet another embodiment, a method of end squaring and/or dividing an elongated material comprises moving a first transport mechanism in response to a first control signal in a substantially parallel direction relative to a first dividing plane. A first engagement element is connected with the first transport mechanism, where the first engagement element includes a first contact surface for engaging the elongated material. A second transport mechanism is movable in response to a second control signal in a substantially parallel direction relative to the first dividing plane, where the second transport mechanism is spaced apart from the first transport mechanism. A second engagement element is connected with the second transport mechanism, where the second engagement element includes a second contact surface for engaging the elongated material. A first detected output and a second detected output are generated representing an actual position associated with the first contact surface and an actual position associated with the second contact surface, respectively, relative to the at least one dividing mechanism. At least one correction factor is generated based on the first detected output and the second detected output, where the correction factor represents a corrected position of at least one of the first contact surface and the second contact surface such that a line between the first contact surface and the second contact surface is substantially perpendicular to the first dividing plane. And, the first control signal and the second control signal are generated representing a desired movement of the first transport mechanism and the second transport mechanism, respectively, relative to the at least one dividing mechanism, and where at least one of the first control signal and the second control signal comprises the at least one correction factor.

In still another embodiment, a method of producing an elongated material with finished side and end dimensions comprises receiving an elongated material with at least one side having a predetermined finished dimension. The actual orientation of the at least one side relative to a predetermined plane is determined. The actual orientation is compared to a desired orientation. A correction factor based is generated on a difference between the actual orientation and the desired orientation. The elongated material is re-oriented with two independently movable positioning mechanisms based on the correction factor. At least one end having a predetermined finished dimension is produced in a predetermined relative relationship to the at least one side having the predetermined finished dimension.

Additional aspects and advantages of the present invention are set forth in part in the description which follows, and in part are obvious from the description, or may be learned by practice of the present invention. The aspects and advantages of the present invention may also be realized and attained by the means of the instrumentalities and combinations particularly pointed out in the appended claims.

BRIEF DESCRIPTION OF THE DRAWINGS

The various embodiments of the present invention will hereinafter be described in conjunction with the appended drawings provided to illustrate and not to limit the present invention, wherein like designations denote like elements, and in which.

DETAILED DESCRIPTION

The present invention is a system and method for end squaring and/or dividing elongated materials. In one particular example, not to be construed as limiting, the present system and method may be utilized in a saw mill application on a second pass saw that creates the final cut dimensions of a sheet or panel of wood. These systems and methods include the use of at least two transport systems or positioning mechanisms that are independently movable to align the sheet of wood in a predetermined orientation relative to a sawing mechanism. Further, the at least two transport systems or positioning mechanisms are synchronizable to maintain the predetermined orientation as they move the sheet of wood toward and/or through the sawing mechanism. Other applications for performing finishing operations on elongated materials also fall within the scope of the present invention.

Figure 1:
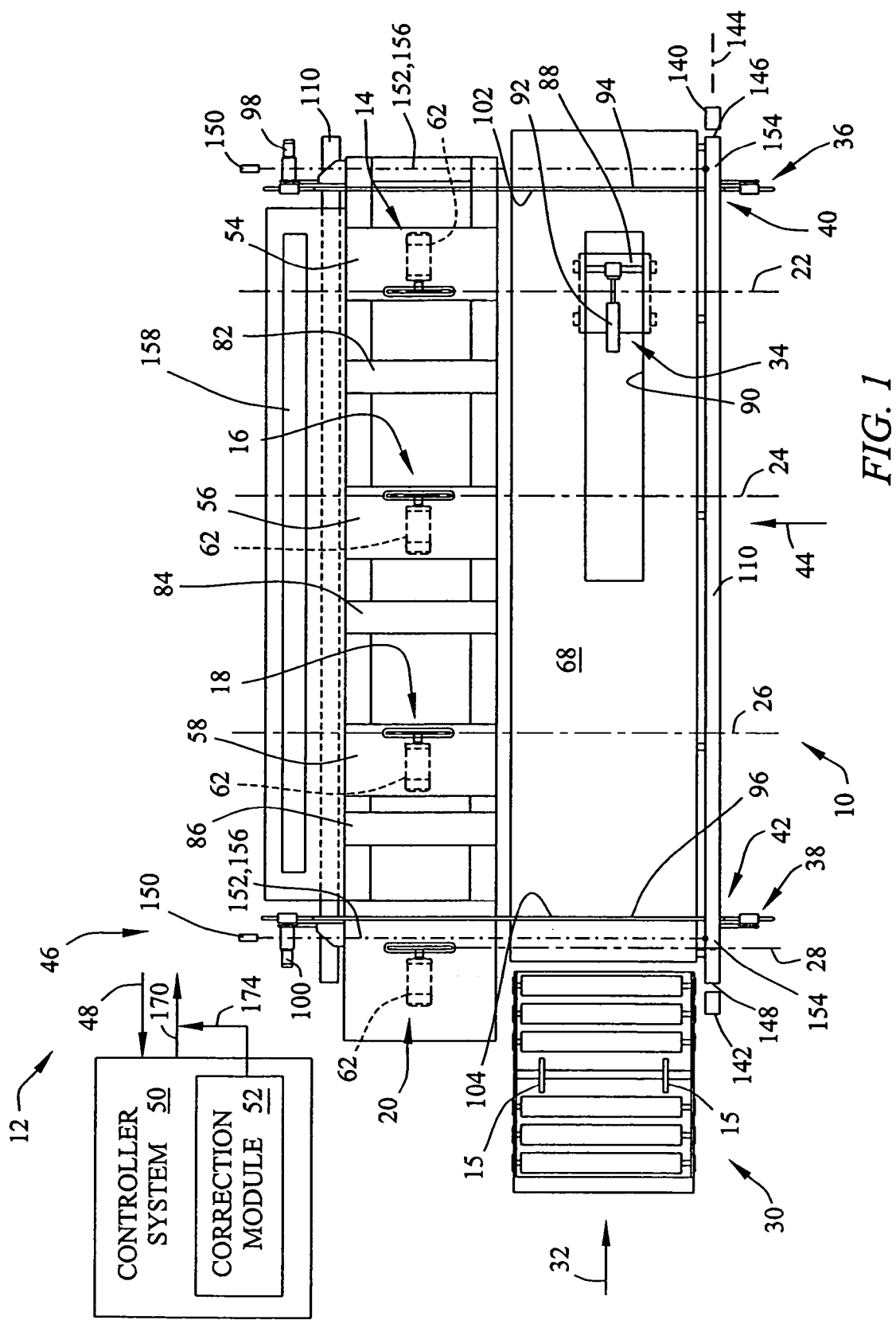
FIG. 1 is a partial schematic top view, with some upper support structure removed for clarity, of one embodiment of an end squaring and/or dividing system.
Figure 2:
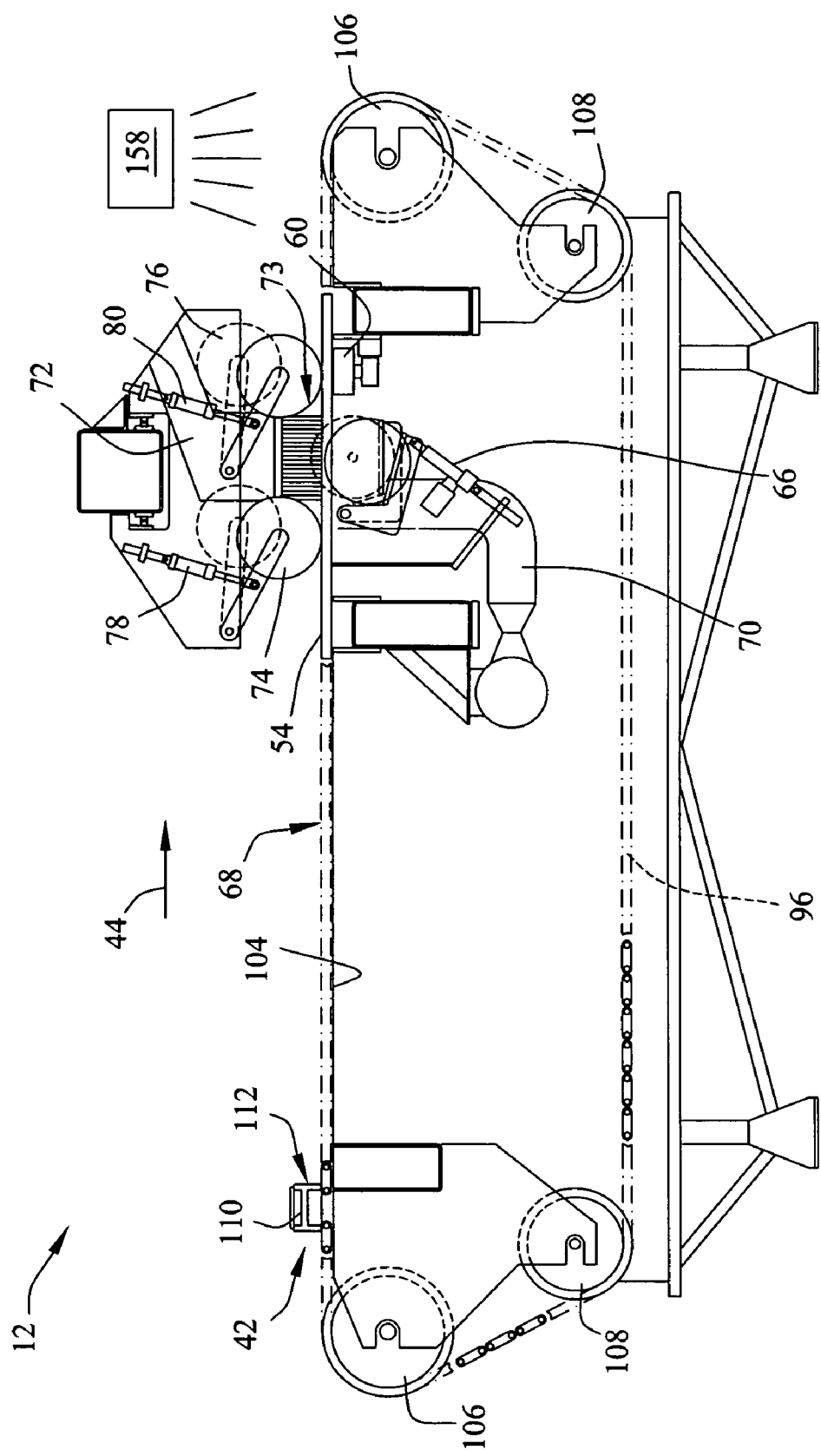
FIG. 2 is a schematic side view of the system of FIG. 1 with side walls and other components removed for clarity.

Referring to FIGS. 1 and 2, one embodiment of a system 10 for end squaring and/or dividing an elongated material includes a machine 12 having one or more dividing mechanisms 14, 16, 18 and 20, such as a rotary saw, for dividing the elongated material at a corresponding dividing plane 22, 24, 26, 28. The dividing planes are substantially parallel in the case of more than one dividing mechanism. A conveyor 30 delivers one of more pieces of the elongated material to machine 12, such as along a conveyed direction 32, until the elongated material is stopped by a backstop system 34. Once in position against backstop system 34, at least first and second transport systems 36, 38 independently move engagement mechanisms 40, 42, respectively, into contact with the one or more pieces of elongated material. The independent transport mechanisms 36, 38, respectively, move the elongated material in a predetermined orientation and speed relative to and through the one or more dividing mechanisms 14, 16, 18, 20, resulting in end squaring and/or dividing of the one or more pieces the elongated material. For example, transport mechanisms 36, 38 may move elongated material in a feed direction 44 substantially parallel to dividing planes 22, 24, 26, 28, which in this case is substantially perpendicular to conveyed direction 32. Additionally, a detector system 46 monitors the actual relative position of transport systems 36, 38 with respect to dividing mechanisms 14, 16, 18, 20, either directly or via the position, orientation and/or dimensions of the one or more pieces of the elongated material or the resulting end squared and divided material. Detector system 46 provides this information as feedback 48 to a controller system 50 that manages the operation of machine 12, and in particular regulates the position and speed of each transport mechanism 36, 38. Controller system 50 includes a correction module 52 that reviews feedback 48 and changes, if necessary, the operational parameters of machine 12, and in particular transport systems 36, 38, to insure that the resulting end squaring and/or dividing of the elongated material falls within predetermined specifications. In particular, controller system 50 independently moves one transport system 36, 38 relative to the other, based on feedback 48, to align the elongated material in a predetermined orientation. Further, controller system 50 synchronizes the movement of transport systems 36, 38 to maintain the predetermined orientation. Thus, system 10 provides an automated system of end squaring and/or dividing an elongated material, such as a wood board or panel, and insures a consistent quality of finished product by providing actual positioning/dimensional input to controller system 50 to modify the performance of machine 12.

While described in one embodiment as rotary saws, dividing mechanisms 14, 16, 18, 20 may include any type of device for separating portions of an elongated material along a dividing plane. Additional suitable examples of a dividing mechanism include, but are not limited to: a band saw; a reciprocating saw; a laser; a fluid cutter, such as a high-pressure stream of water, or air mixed with abrasive particles; a router; a cutting mechanism, such as a knife-like or a scissor-like device; a grinder; and any other type of device capable of separating portions of an elongated material. In an embodiment where the elongated material comprises a wood sheet or panel, for example, a suitable dividing mechanism 14 includes a rotary or splitter saw, a hog head saw or an edge trimmer.

In one embodiment, referring to FIGS. 1 and 2 for example, dividing mechanisms 14, 16, 18, 20 may be independently spaced across machine 12 and at least one may be movable via a linearly positionable carriage bed 54, 56, 58. A positioning mechanism 60, such as a servo-motor with a pinion connected to a rack, is operable via controller system 50 to move carriage beds 54, 56, 58 within a channel and align dividing mechanisms 14, 16, 18 and hence dividing planes 22, 24, 26 depending on the desired size of the resulting divided pieces of elongated material. Further, a rotary motor 62 is mounted on each carriage bed 54, 56, 58 and rotates at least one attached planar saw blade 64 (FIGS. 2 and 3) via instructions from controller system 50. Further, each motor 62 and blade 64 may be adjustably mounted to each carriage bed 54, 56, 58 (or, for non-moving dividing mechanisms, to other support structure) through an actuator mechanism 66 (FIGS. 2 and 3), such as a controllable piston. In response to instructions from controller system 50, actuator mechanism 66 moves between at least a first and a second position corresponding to a first, non-cutting position to a second, cutting position of blade 64. For example, in the second position, each blade 64 extends above the top surface of the respective carriage bed 54, 56, 58 and into a position for cutting engagement with the incoming elongate material. As such, the top surface of each carriage bed 54, 56, 58 is substantially in the same plane as the support surface 68 that receives the elongated material from conveyor 30.

Additionally, referring to FIG. 2, each dividing mechanism 14, 16, 18, 20 may include a lower dust collection system 70 and an upper dust collection system 72 for removing debris from the dividing mechanisms. Each dust collection system 70, 72 may be connected to a vacuum source (not shown). Further, a containment skirt 73, such as a brush with flexible bristles, may surround each blade 64 in the second position such that a majority of debris may be directed toward dust collection systems 70, 72. Additionally, each dividing mechanism 14, 16, 18, 20 may include a pair of hold-down mechanisms 74, 76 upstream and downstream relative to blade 64 to insure that elongated material does not vibrate or otherwise change position during the cutting operation. Hold-down mechanisms 74, 76 may include any type of structure, such as a roller or a non-rotating smooth surface, positioned to bias the incoming elongated material down against the top surface of carriage bed 54, 56, 58 or other support structure. In one embodiment, for example, hold-down mechanisms 74, 76 include actuators 78, 80 operated by controller system 50 that move the mechanisms between a first, non-contacting position and a second contacting position with respect to elongated material and/or the top surface of carriage beds 54, 56, 58. Further, referring to FIG. 1, one or more movable intermediate beds 82, 84, 86 may be placed between carriage beds 54, 56, 58 to provide an additional support surface for the elongated material as it is being processed by dividing mechanisms 14, 16, 18, 20. Intermediate beds 82, 84, 86 may be independently movable, such as via a positioning mechanism controlled by controller system 50, or they may move in association with carriage beds 54, 56, 58.

Referring back to FIG. 1, conveyor 30 includes any type of mechanism for delivering an elongated material to support surface 68 and backstop system 34. Suitable examples of conveyor 30 include a series of rollers, ball bearings, belt conveyors, an air cushion, chain driven support structures, etc. Conveyor 30 may include at least one driven component, such a controllable driven wheel, capable of imparting a force upon elongated member to move it to support surface 68 and against backstop system 34. In such an embodiment, for example, controller system 50 may manage operation of the driven component such that the delivery of material and end squaring and/or dividing operations may be synchronized. Additionally, in another embodiment, conveyor 30 may include at least one dividing mechanism 15, similar to dividing mechanisms 14, 16, 18, 20, that divides elongated material along a dividing plane substantially parallel to conveyed direction 32. As such, conveyor 30 with at least one dividing mechanism 15 may comprise a first pass sawing machine that forms final dimensions of one or both sides of the elongated material.

Figure 3:
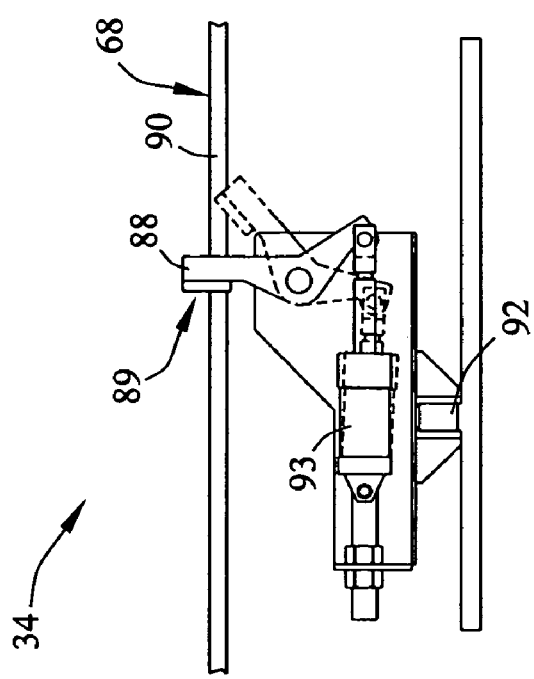
FIG. 3 is a schematic front view of a backstop system associated with the system of FIG. 1.
Figure 4:
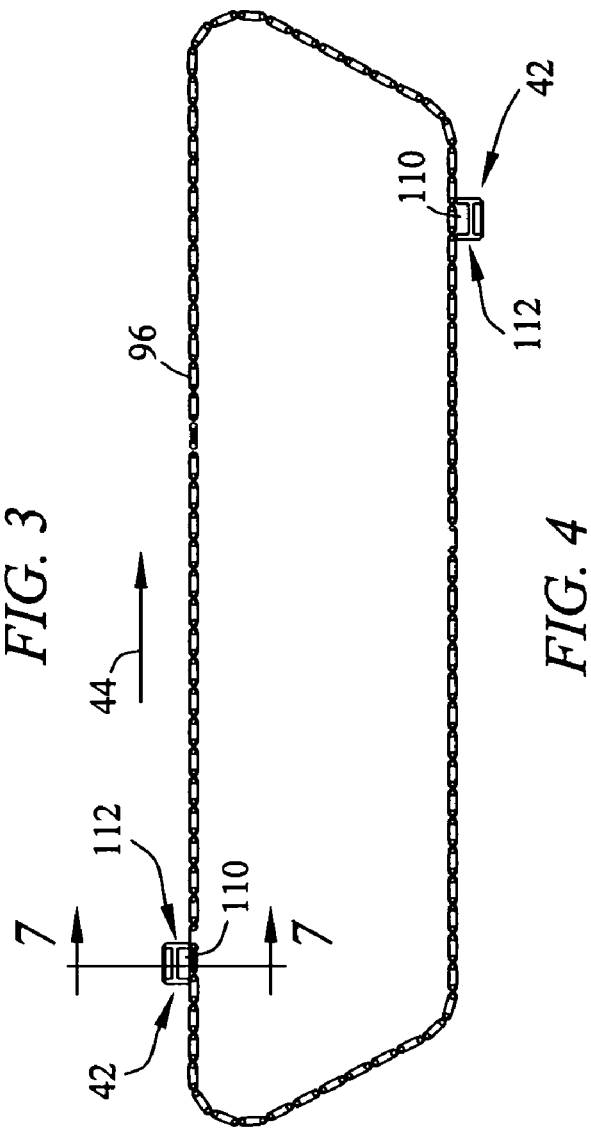
FIG. 4 is a side view of a chain and pusher bar or engagement member assembly associated with the system of FIG. 1.

Referring to FIGS. 1 and 3, backstop system 34 includes a limiting member 88 movable within an opening 90 in support surface 68 to align the elongated material in a predetermined position relative to the one or more dividing planes 22, 24, 26, 28. Limiting member 88 may comprise a rigid material having a planar surface 89, at a known position, against which one end of elongated member is positioned. A positioning mechanism 92, such as an actuator or driven rack and pinion system, receives instructions from controller system 50 and subsequently moves limiting member 88 so that its planar surface is in the predetermined position. Additionally, limiting member 88 may be movable relative to the plane of support surface 68, such as by another actuator mechanism 93 operated by controller system 50, so as to extend at least partially above or entirely below support surface. For example, limiting member 88 may be in a first position where its planar surface 89 extends above support surface 68 and substantially parallel to dividing planes 22, 24, 26, 28, such as when elongated material is being delivered to backstop system 34. Further, limiting member 88 may be in a second position entirely below support surface 68, where it is no longer in contact with the elongated material, such as when transport systems 36, 38 engage the elongated material.

First and second transport systems 36, 38 include any type of mechanism capable of moving the elongated material through the one or more dividing mechanisms 14, 16, 18, 20 in a predetermined orientation. Suitable examples of transport systems 36, 38 include chain-driven support structures, rollers, ball bearings, belt conveyors, air cushion systems, etc. As discussed above, transport systems 36, 38 advantageously are independent of one another, and thus may be moved separately to adjust the orientation of the elongated material prior to and/or during processing by dividing mechanisms 14, 16, 18, 20. Additionally, system 10 includes at least two transport mechanisms 36, 38 each engaging the elongated material at at least one point to allow the orientation of the elongated material to be adjusted relative to dividing planes 22, 24, 26, 28. In particular, in a sawing machine, the elongated material is sawn into a number of smaller pieces that each have a specification relating to squareness, or the perpendicularity of its outer edges—at least two of which are created by the saws of machine 12. As such, controller system 50 independently adjusts the movement and position of each transport mechanism 36, 38 such that a line drawn through the corresponding points that contact the elongated material is substantially perpendicular to the one or more dividing planes 22, 24, 26, 28 at some predetermined time or range of times relative to moving the elongated material through dividing mechanisms 14, 16, 18, 20.

In one particular embodiment, referring to FIGS. 1, 2 and 4–7, transport systems 36, 38 include first and second endless chains 94, 96 driven by independent, controllable drives 98, 100 (FIG. 1). For example, drives 98, 100 may include closed loop drive systems such as servo drives, vector drives and variable frequency drives, etc., such that a relative speed and position of each drive may be precisely determined and controlled by controller system 50. Endless chains 94, 96 may be supported on longitudinally extending chain races 102, 104 (FIGS. 1 and 2) and around sprockets 106, 108 at each end. In one embodiment, for example, endless chains 94, 96 are precision block chains made out of a metal, which provides a durable, stretch-resistant chain with dimensionally-stable features. At least one engagement member 110 may be individually connected to a respective transport system 36, 38 to contact and move the elongated material across support surface 68 and through one or more dividing mechanisms 14, 16, 18, 20. Each engagement member 110 may be secured to each transport system 36, 38 via mechanical or chemical methods, such as by pinning, bolting, screwing, bonding or welding. Engagement member 110 may hold the elongated material, or may simply contact the elongated material and transfer the motive force of the associated transport systems 36, 38. Engagement member 110 may include a rigid material projecting from transport systems 36, 38 and extending above support surface 68. As such, engagement member 110 includes at least one contact surface 112 that provides at least a two point contact with the elongated material. In one embodiment, for example, engagement member 110 includes a longitudinally extending rigid bar having a substantially planar contact surface 112 substantially perpendicular to dividing planes 22, 24, 26, 28.

Figure 5:
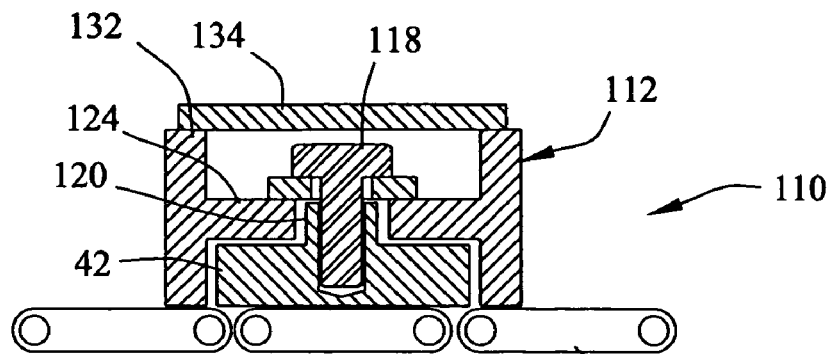
FIG. 5 is a cross-sectional view of a connection mechanism along line 5—5 in FIG. 7.
Figure 6:
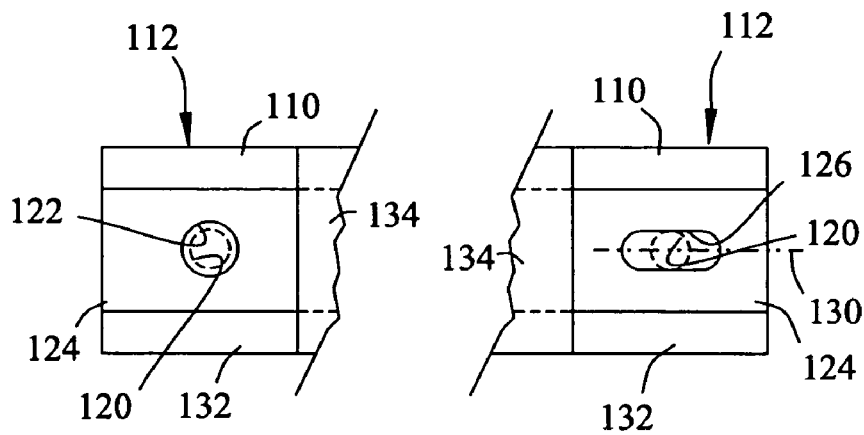
FIG. 6 is a schematic top view of the engagement member and portions of connection mechanisms of FIGS. 4 and 5.
Figure 7:
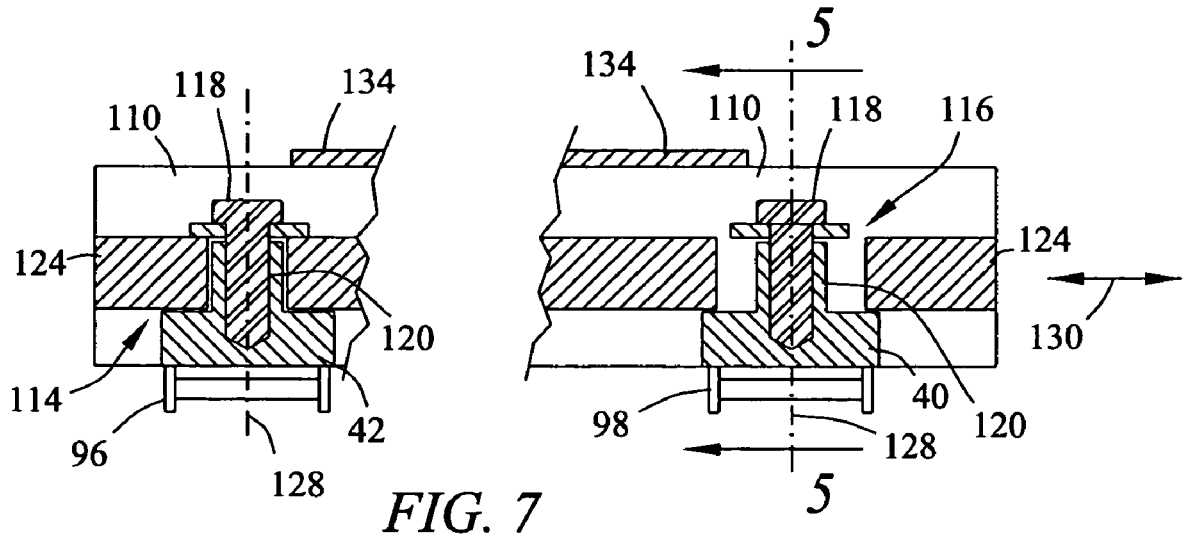
FIG. 7 is a sectional view of the engagement member and connection mechanisms along line 7—7 in FIG. 4.
Figure 8:
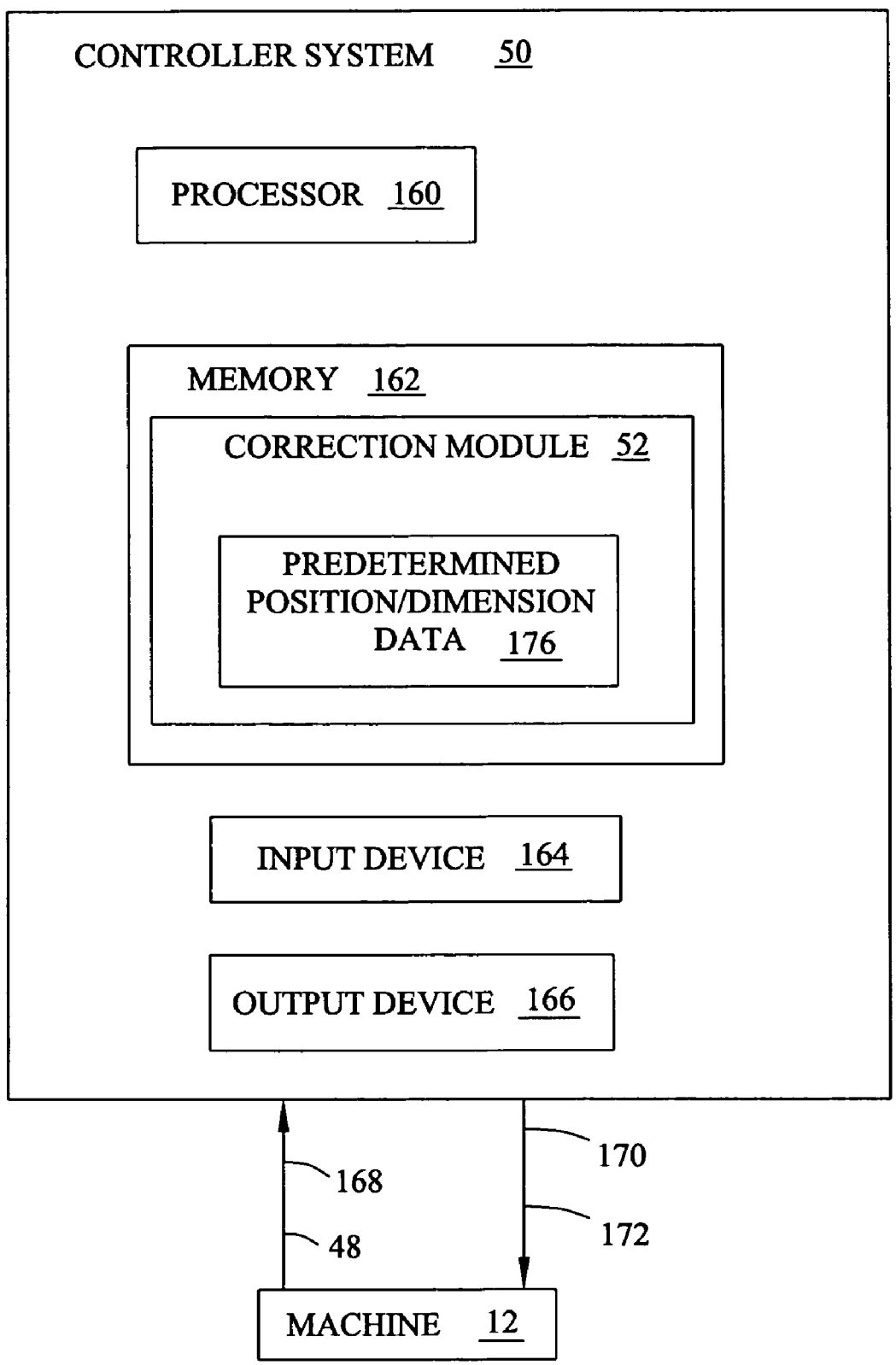
FIG. 8 is a schematic box diagram of one embodiment of the controller system and machine of FIG. 1.
Figure 9:
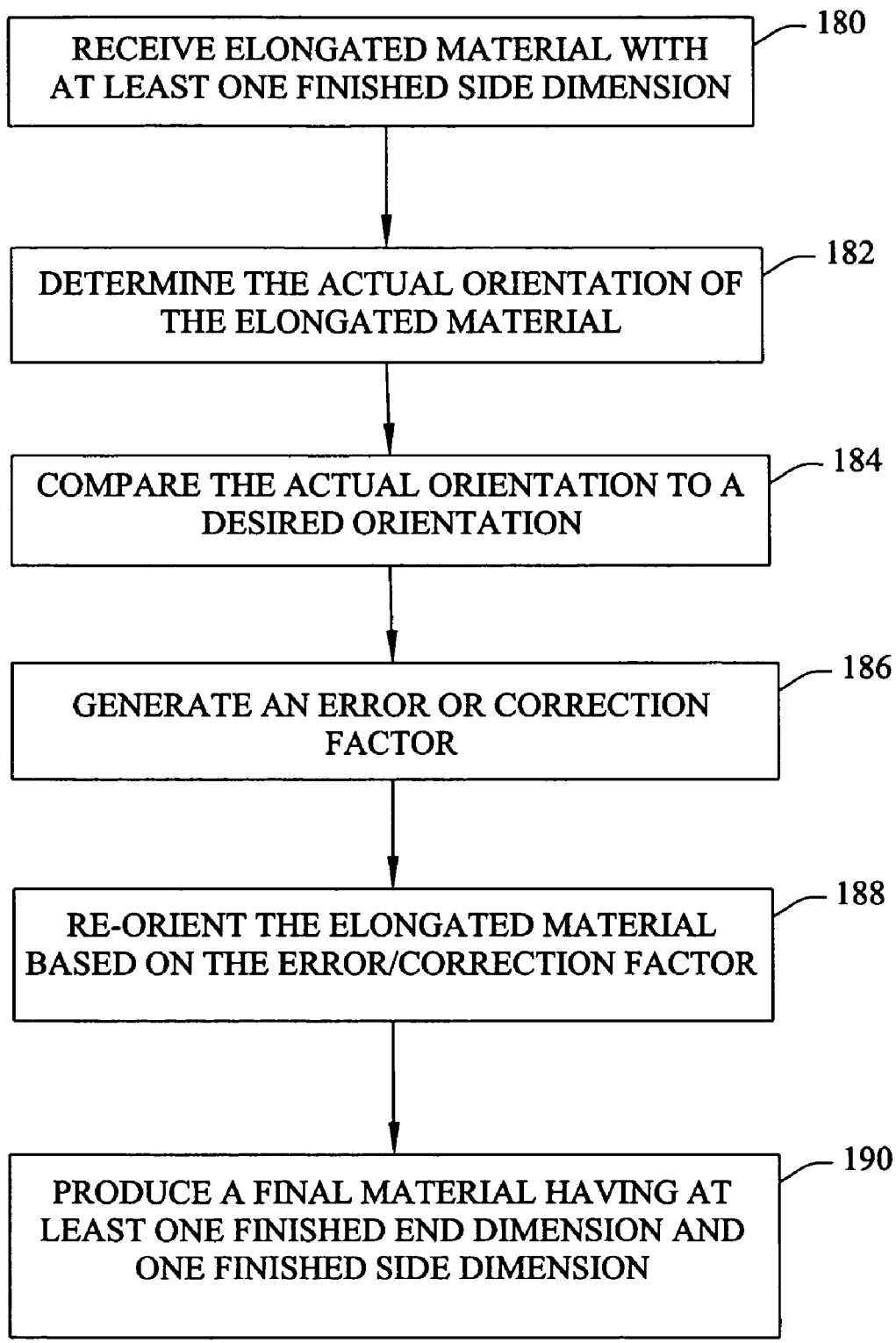
FIG. 9 is a flow chart of one embodiment of a method for end squaring and/or dividing an elongated material.

Referring particularly to FIGS. 5–7, in a case where engagement member 110 is defined by a longitudinally extending bar that interconnects transport systems 36, 38, system 10 advantageously includes at least one rotatable connection mechanism 114 that rotatably connects, in at least one plane, engagement member 110 with one or both transport mechanisms. This rotatable connection mechanism 114 allows each transport system 36, 38 to move independently and to adjust the orientation of contact surface 112 relative to dividing planes 22, 24, 26, 28. System 10 may further include a rotatable and slidable connection mechanism 116 at an end of engagement member 110 opposite rotatable connection mechanism 114 to allow for rotation and lateral movement in at least one plane. In particular, in one embodiment, connection mechanisms 114 may include a securing mechanism 118, such as a bolt and washer, that is fixedly positionable within a cylindrical extension 120 of the respective engagement mechanism 40, 42. Cylindrical extension 120 is positionable within a corresponding circular opening 122 (FIG. 6) in flange 124 of engagement member 110 for rotatable connection mechanism 114. In contrast, for rotatable/slidable connection mechanism 116, cylindrical extension 120 is positionable within slotted opening 126 (FIG. 6) in flange 124. For rotatable connection mechanism 114, circular opening 122 and cylindrical extension 120 are sized and secured together such as to only permit relative rotational motion about a vertical axis 128 extending through cylindrical extension 120. For rotatable/slidable connection mechanism 116, slotted opening 126 and cylindrical extension 120 are sized and secured together such as to permit relative rotational motion about axis 128 and lateral motion along slot longitudinal axis 130. Such lateral motion may be desired if engagement member 110 becomes too far out of square relative to dividing planes 22, 24, 26, 28, where the engagement member would need to be both rotated and laterally shifted by movement of transport systems 36, 38 in order to return it to the desired alignment. Additionally, for additional stabilization and to prevent deflection, engagement member 110 may further include a support wall 132 and a support plate 134. Support wall 132 may extend perpendicularly relative to flange 124 and may further be positioned to interact with engagement members 40, 42. Support plate 134 may extend between the wall of contact surface 112 and support wall 134 for the major portion of the length of engagement member 110 to prevent twisting or deflection of contact surface 112. Additionally, support wall 134 may end or have an opening that allows access to connection mechanisms 114, 116.

Rather than using a connecting member such as engagement member 110, it should be understood that each transport systems 36, 38 may be variably spaced and may include separate and independent engagement members 40, 42 with separate contact surfaces 112. In another embodiment, for example, each transport system 36, 38 may include independent, non-connected engagement members 40, 42 that project above support surface 68 and that each provide a contact surface 112 that engages the elongated material. Examples of such independent engagement members 40, 42 include a pin, a block, a lug, etc.

Detector system 46 includes any system capable of determining a relative position between each transport system 36, 38, or the elongated material, and at least one dividing mechanism 14, 16, 18, 20 and/or dividing plane 22, 24, 26, 28. Alternatively, detector system 46 includes any system capable of determining a dimension of the elongated material and associating the dimension with a relative position of the elongated material and/or transport systems 36, 38 with respect to at least one dividing mechanism 14, 16, 18, 20 and/or dividing plane 22, 24, 26, 28. Suitable examples of detector system 46 include, but are not limited to, one or a combination of: a proximity sensor system, such as inductive, capacitive and photoelectric sensors; a laser sensor system; an optical vision system; a fiberoptic sensor system; a camera system; and other similar systems capable of directly or indirectly determining a position of a portion or orientation of the elongated material or transport systems 36, 38.

Referring to FIGS. 1 and 2, for example, one embodiment of detector system 46 includes a pair of inductive proximity sensors 140, 142 mounted on machine 12 along a predetermined or home axis 144 adjacent to each transport mechanism 36, 38. In this case, predetermined or home axis 144 is substantially perpendicular to at least one dividing plane 22, 24, 26, 28. Additionally, a corresponding pair of metal targets 146, 148 are secured within the opposite ends of engagement member 110, or secured to some other structure associated with a moving portion of each transport systems 36, 38. As such, the state of proximity sensors 140, 142 changes as targets 146, 148 reach a predetermined position substantially adjacent to the sensors, and thus the actual position of engagement member 110 relative to dividing planes 22, 24, 26, 28 is determinable. For example, the change of state of sensors 140, 142 is sent as an input signal or feedback 48 to controller system 50, which determines a difference between a line through the two actual positions with a desired line perpendicular to at least one dividing plane 22, 24, 26, 28 and changes a position and/or movement of one or both transport systems 36, 38 to correct for the difference, if necessary.

In another embodiment, still referring to FIGS. 1 and 2, detector system 46 may include at least one laser sensor 150 that transmits a laser beam 152 toward a target 154, such as a reflector, the opposite ends of engagement member 110. Alternatively, target 154 may be secured to some other structure associated with a moving portion of each transport systems 36, 38. The at least one laser sensor 150 further receives the reflected laser beam 156, which in combination with transmitted laser beam 152 relates to an actual position of each end of engagement member 110. These actual positions may be sent as an input signal or feedback 48 to controller system 50, which determines a difference between a line through the two actual positions with a desired line perpendicular to at least one dividing plane 22, 24, 26, 28 and changes a position and/or movement of one or both transport systems 36, 38 to correct for the difference, if necessary.

In yet another embodiment, still referring to FIGS. 1 and 2, detector system 46 may include a optical measuring system 158 positioned adjacent to the back end of machine 12 for measuring one or more actual dimensions of one or more pieces of the divided elongated material. For example, optical measuring system 158 may include a camera for sensing the edges of one or more small wood panels cut by machine 12 from a large wood panel. The dimensions detected by optical measuring system 158 may be sent as an input signal or feedback 48 to controller system 50, which determines a difference between the actual dimensions and a desired set of dimensions, such as a specified amount of squareness, and changes a position and/or movement of one or both transport systems 36, 38 to correct for the difference, if necessary.

Controller system 50 includes any type of device having a processor 160 and memory 162 for storing control logic or software, such as correction module 52 and other operational applications for running machine 12. The control logic or software, when executed by processor 160, causes the processor to perform predetermined functions associated with aspects of the invention as described herein. Alternatively, controller system 50 may comprise hardware, firmware or combinations thereof (including software) capable of controlling the operation of machine 12, or at least capable of controlling a position and speed of transport systems 36, 38. Suitable examples of controller system 50 include, but are not limited to, one or any combination of: a programmable logic controller ("PLC"); a computer device having a processing unit and a memory, such as a mainframe, a workstation, a laptop, a minicomputer, a personal computer, a workstation, a server, a mobile phone, a pager, a portable two-way communications device, a supercomputer, a telephony device, a wireless device, a network computer and any device having a processor and/or a repository for data or a connection thereto. In alternative embodiments, controller system 50 may include other devices for allowing computer programs or other instructions to be loaded into controller system 50. Such devices may include, for example, a removable storage unit and an interface, such as: a program cartridge and cartridge interface such as that found in video game devices; a removable memory chip such as an erasable programmable read only memory (EPROM), or programmable read only memory (PROM), and associated socket; and other removable storage units and interfaces that allow software and data to be transferred from the removable storage unit to controller system 50. In an embodiment where aspects of the invention are implemented using software, the software may be stored in a computer program product and loaded into controller system 50 using a removable storage drive, a hard drive, or a communications interface. In another embodiment, aspects of the invention are implemented primarily in hardware using, for example, hardware components such as dedicated devices that may include application specific integrated circuits (ASICs) or other specific hardware. In yet another embodiment, aspects of the invention are implemented using a combination of both hardware and software. Additionally, controller system 50 may include an input device 164, such as a mouse or keyboard, for inputting information into the controller and an output device 166, such as a visual display unit and/or an audio speaker, for outputting system information.

Controller system 50 receives input signals 168 relating to the performance of any or all components of machine 12 and generates control signals 170 to any or all controllable components of the machine in order to control the operation of the machine. For example, input signals 168 and control signals 170 may relate to one or more of the following: an initial size of elongated material entering machine 12; a final cut size of one or more pieces of divided elongated material; parameters relating to the operation of a dividing mechanism, such as a speed and a position; parameters relating to the operation of conveyor; parameters relating to the operation of backstop system; speed, orientation and position of transport systems, engagement mechanisms, engagement members, contact surfaces, and divided and non-divided elongated materials; dimensions of divided and non-divided elongated materials; parameters relating to the operation of detector system; and parameters relating to the operation of controller system. In particular, as discussed above, one form of input signal 168 includes feedback 48 while one form of control signal 170 includes transport control signals 172 specifically directed to operating transport systems 36, 38.

Correction program or module 52 receives feedback 48 and may generate at least one correction factor 174, which may be a component of transport control signal 172. Correction program or module 52 compares the actual position/dimension data gathered by detector system 46 and forwarded as feedback 48, with a predetermined set of position/dimensional data 176. Correction program or module 52 determines any difference between feedback 48 and predetermined position/dimension data 176 and generates this difference as an error or correction factor 174. For example, predetermined position/dimension data 176 may include data relating to the cut, quality and dimensional standards of elongated material. Further, correction program or module 52 may further include decision-making instructions relating to acceptable and non-acceptable error or correction factors 174, such that a given error or correction factor 174 may not be incorporated into transport control signal 172 unless it falls outside of an acceptable range. In one embodiment, for example, correction factor 174 is based on feedback 48 and represents a corrected position of at least one transport system 36, 38, and hence a corrected position of at least one of the first and second contact points of contact surface 112, such as each end of a longitudinally extending bar that connects each transport system. In this manner, the corrected line between the first and second contact points of contact surface 112 is substantially perpendicular to at least one dividing plane 22, 24, 26, 28. Additionally, correction program or module 52 may further incorporate other algorithms or statistical analysis type programs, for example to make changes to transport control signal 172 according to predictive estimates based on feedback 48 to attempt to proactively control transport systems 36, 38 before an error or correction factor 174 exceeds an allowable limit.

In operation, referring to FIG. 10, in one exemplary application such as in a saw mill, a second pass sawing machine incorporating an embodiment of the present systems and methods operates on a relatively large, rough cut wooden sheet or panel and creates at least one, and typically two or more, relatively smaller final cut wooden panel having finished dimensions. In this instance, the term "finished dimension" refers to a dimension that falls within a predetermined range of quality specifications associated with a final product, such as flatness, linearity, squareness, width, length, etc. The second pass sawing machine receives an elongated material, such as the rough cut wooden sheet or panel, with at least one side having a finished dimension (Block 180). The term "side" refers to the two substantially parallel edges of the wooden sheet that lie along the longest axis or length of the sheet. Similarly, a term "end" refers to the two substantially parallel edges of the wooden sheet lying along the shortest axis or width of the sheet, which are substantially perpendicular to the sides. Although described as having at least one finished dimension, typically the second pass sawing machine receives the rough cut wooden panel with both sides having a finished dimension as a result of those sides being cut in a prior operation, such as by a first pass saw. The second pass sawing machine supports the wooden sheet on a support surface that extends in a horizontal plane, which is substantially parallel to the plane of the wooden sheet.

The second pass sawing machine then orients the at least one finished dimension of the wooden panel relative to at least one plane, such as a dividing plane associated with a sawing mechanism. For instance, in order to create a final cut wooden panel having finished dimensions that fall within a squareness specification, the second pass sawing machine aligns the at least one finished side along an axis that is substantially perpendicular to the cutting plane of one or more rotary saws that are associated with the machine and that form the dimensions of the ends of the one or more final cut wooden panels. In order to orient the wooden panel, at least two independently controllable transport systems contact or engage the wooden panel with engagement mechanisms to position the wooden panel relative to the sawing mechanism. These two transport systems, and their associated engagement mechanisms, are independently movable in a direction parallel to the dividing plane, and hence are able to move the wooden panel toward and through the sawing mechanism. A controller system that operates the second pass sawing machine sends control signals to each transport system to instruct it on how exactly to move to properly orient the wooden panel.

In order to determine how to orient the wooden panel, a detector system includes a sensor that determines an actual position of the wooden panel or each transport system (and corresponding engagement mechanism), or an actual dimension of the wooden panel. The detector system relays the actual position/dimension information to the control system in one or more detected output signals. For instance, the detector system may measure the exact position of a predetermined portion of each transport system, such as a contact surface of each engagement mechanism. Alternatively, the detector system may measure the exact position of a finished side of the wooden panel or an exact position or dimension of a finished side or finished end.

The controller system receives the one or more detected output signals and provides them to a correction module. The correction module determines an actual orientation of the wooden panel based on the actual position/dimension information and compares this with a desired orientation or range of desired orientations (Blocks 182 and 184). For example, the desired orientation (or range of desired orientations) is a position of the wooden panel that results in the final cut wooden panel achieving the desired finished dimensions. Typically, the desired finished dimensions include a range of dimensions, or a nominal finished dimension with a tolerance, and as such there may be a nominal desired orientation and a range of desired orientations. The correction module determines a difference between the actual orientation and the desired orientation, and if the difference falls outside of the predetermined range or tolerance, then the correction module generates at least one error or correction factor (Block 186). The error or correction factor is an adjustment to the actual orientation to change the actual orientation to the desired orientation, or at least to an orientation within the range of desired orientations.

The controller system may then incorporate the at least one error or correction factor into the control signal for at least one of the first or second transport system so that the relative orientation of the wooden panel is changed to the desired orientation (Block 188). It should be noted that the controller system may continually incorporate the error or correction factor into the control signals, so as to continually adjust the wooden panel as it is being cut, or the error or correction factor may only be incorporated at one or more predetermined points in time, such as at a time just before the wooden panel is cut. For instance, in an embodiment where a longitudinally extending engagement member connects the two transport systems, a pair of proximity sensors may determine an actual position of the engagement member and the correction module may adjust the position of each transport mechanism so that the longitudinal axis of the engagement member is substantially perpendicular to the cutting plane of the sawing mechanisms. For example, the correction module may include a virtual axis and each transport mechanism may be configured as a slave axis that is adjusted to match the virtual axis. The controller system may then move each transport system in a synchronized manner such that the engagement member pushes the wooden panel through the sawing mechanism in an orientation that results in end squaring and dividing of the panel that falls within finished dimension specifications. Thus, second pass sawing machine produces a final cut wooden panel having at least two finished dimensions, such as an end and a side having a predetermined squareness, by determining an actual orientation of the wooden panel, or the associated transport systems, and independently adjusting and moving each transport system relative to the sawing mechanism (Block 190).

While the various embodiments of the present invention have been illustrated and described, it will be clear that the present invention is not limited to these embodiments only. Numerous modifications, changes, variations, substitutions and equivalents will be apparent to those skilled in the art without departing from the spirit and scope of the present invention as described in the claims.

What is claimed is:

1. A system for end squaring and/or dividing an elongated material, comprising:
    at least one dividing mechanism having a first dividing plane;
    a first transport mechanism movable in response to a first control signal in a substantially parallel direction relative to the first dividing plane;
    a first engagement element connectable with the first transport mechanism and having a first contact surface for engaging the elongated material;
    a second transport mechanism spaced apart from the first transport mechanism and movable independently from the first transport mechanism in response to a second control signal in a substantially parallel direction relative to the first dividing plane;
    a second engagement element connectable with the second transport mechanism and having a second contact surface for engaging the elongated material;
    a detector system having a first detected output and a second detected output representing an actual position associated with the first contact surface and an actual position associated with the second contact surface, respectively, relative to the at least one dividing mechanism;
    a correction module having a correction program that generates at least one correction factor based on the first detected output and the second detected output, wherein the correction factor represents a corrected position of at least one of the first contact surface and the second contact surface such that a line between the first contact surface and the second contact surface is substantially perpendicular to the first dividing plane; and
    a controller system operable to generate the first control signal and the second control signal representing a desired movement of the first transport mechanism and the second transport mechanism, respectively, relative to the at least one dividing mechanism, and wherein at least one of the first control signal and the second control signal comprises the at least one correction factor.

2. The system of claim 1, wherein the first engagement element and the second engagement element are defined within a substantially rigid elongated member extending between the first transport mechanism and the second transport mechanism.

3. The system of claim 2, wherein the substantially rigid elongated member is rotatably connectable to at least one of the first transport mechanism and the second transport mechanism about an axis substantially parallel to the first dividing plane.

4. The system of claim 2, further comprising a first connection mechanism and a second connection mechanism connecting the substantially rigid elongated bar and the first transport mechanism and the second transport mechanism, respectively, the first connection mechanism having a first limiting surface substantially defining a circle that rotatably secures the elongated member in a second plane substantially perpendicular to the first dividing plane, and the second connection mechanism having a second limiting surface substantially defining a slot in the second plane that fixedly secures the elongated member in the substantially parallel direction of movement and slidingly secures the elongated member in a direction substantially perpendicular to the direction of movement.

5. The system of claim 1, wherein the correction module generates the at least one correction factor and wherein the controller system updates at least one of the first control signal and the second control signal prior to the dividing mechanism dividing the elongated material.

6. The system of claim 1, wherein the correction module generates the at least one correction factor and wherein the controller system updates at least one of the first control signal and the second control signal continuously throughout dividing of the elongated material by the dividing mechanism.

7. The system of claim 1, wherein the first contact surface and the second contact surface each move from respective first positions to respective second positions, wherein the respective first positions correspond to positions where the elongated material does not engage the at least one dividing mechanism and the respective second positions correspond to positions where the elongated material initially engages the at least one dividing mechanism, and wherein the desired movement comprises a synchronized movement at at least the second position.

8. The system of claim 1, wherein the first contact surface and the second contact surface each move from respective second positions to respective third positions, wherein the respective second positions correspond to positions where the elongated material initially engages the at least one dividing mechanism and the respective third positions correspond to positions where the elongated material ends engagement with the at least one dividing mechanism, and wherein the desired movement comprises a continuously synchronized movement between at least the respective second positions and the respective third positions.

9. The system of claim 1, wherein the dividing mechanism is selected from the group consisting of a rotary saw, a band saw, a reciprocating saw, a laser, a fluid cutter, a router, a knife-like mechanism, a scissor-like mechanism, and a grinder.

10. The system of claim 1, wherein the detector system is selected from the group consisting of a proximity sensor system, a laser system, an optical sensor, and a camera system.

11. The system of claim 1, wherein the transport system is selected from the group consisting of a chain-driven system, a roller system, a ball bearing system, a belt conveyor system, and an air cushion system.

12. The system of claim 1, wherein the controller system further comprises a processor and a memory.

13. The system of claim 1, wherein the elongated material comprises a material selected from a wood, a plastic and a composite material.

14. The system of claim 1, wherein the desired movement comprises the first contact surface and the second contact surface moving in synchronization.

15. A system for positioning a substantially rigid sheet of material, comprising:
a first positioning mechanism having a first engagement surface movable in a first direction, wherein the first engagement surface includes a first linear portion perpendicular to the first direction, the first positioning mechanism having a first drive connectable with the first engagement surface and operable to move the first engagement surface in the first direction according to a first predetermined control signal;
a second positioning mechanism having a second engagement surface movable along a substantially parallel path relative to first engagement surface, wherein the second engagement surface includes a second linear portion perpendicular to the first direction, the second positioning mechanism having a second drive connectable with the second engagement surface and operable to move the second engagement surface in the first direction according to a second predetermined control signal, wherein the second drive is independently movable relative to the first drive;
a detector system operable to generate at least one position signal corresponding to an actual position of the first engagement surface relative to the second engagement surface;
a controller system operable to generate the first predetermined control signal, the second predetermined control signal and at least one correction signal, wherein the correction signal is based upon the at least one position signal and comprises a difference between the actual position of the first engagement surface relative to the second engagement surface and a predetermined position, wherein the predetermined position comprises a position wherein a first plane through a first predetermined portion of the first positioning mechanism and a second predetermined portion of the second positioning mechanism is substantially perpendicular to the first direction, and wherein at least one of the first predetermined control signal and the second predetermined control signal includes the at least one correction signal.

16. The system of claim 15, further comprising a third positioning mechanism having a third engagement surface alignable in a second plane perpendicular to the first plane.

17. The system of claim 16, further comprising a longitudinally extending engagement member that interconnects the first positioning mechanism and the second positioning mechanism and incorporates the first engagement surface and the second engagement surface, and further comprising a first connection mechanism rotatably connecting a first portion of the engagement member to the first positioning member and a second connection mechanism rotatably and slidably connecting a second portion of the engagement member to the second positioning member.

18. A method of end squaring and/or dividing an elongated material, comprising:
moving a first transport mechanism in response to a first control signal in a substantially parallel direction relative to a first dividing plane;
connecting a first engagement element with the first transport mechanism, where the first engagement element includes a first contact surface for engaging the elongated material;
moving a second transport mechanism in response to a second control signal in a substantially parallel direction relative to the first dividing plane, where the second transport mechanism is spaced apart from the first transport mechanism;
connecting a second engagement element with the second transport mechanism, where the second engagement element includes a second contact surface for engaging the elongated material;
generating a first detected output and a second detected output representing an actual position associated with the first contact surface and an actual position associated with the second contact surface, respectively, relative to the at least one dividing mechanism;
generating at least one correction factor based on the first detected output and the second detected output, wherein the correction factor represents a corrected position of at least one of the first contact surface and the second contact surface such that a line between the first contact surface and the second contact surface is substantially perpendicular to the first dividing plane; and
generating the first control signal and the second control signal representing a desired movement of the first transport mechanism and the second transport mechanism, respectively, relative to the at least one dividing mechanism, and where at least one of the first control signal and the second control signal comprises the at least one correction factor.

19. The method of claim 18, further comprising synchronizing the movement of the first transport mechanism and the second transport mechanism.

20. A method of producing an elongated material with finished side and end dimensions, comprising:
receiving an elongated material with at least one side having a predetermined finished dimension;
determining the actual orientation of the at least one side relative to a predetermined plane;
comparing the actual orientation to a desired orientation;
generating a correction factor based on a difference between the actual orientation and the desired orientation;
re-orienting the elongated material with two independently movable positioning mechanisms based on the correction factor; and
producing at least one end having a predetermined finished dimension in a predetermined relative relationship to the at least one side having the predetermined finished dimension.

21. The method of claim 20, wherein producing the at least one end further comprises moving the two positioning mechanisms in synchronization.

* * * * *